(12) United States Patent
Badry

(10) Patent No.: US 7,976,265 B2
(45) Date of Patent: Jul. 12, 2011

(54) GROUND LEVEL LOADING TRAILOR

(76) Inventor: Merlin Badry, Forestburg (CA)

(*) Notice: Subject to any disclaimer, the term of this patent is extended or adjusted under 35 U.S.C. 154(b) by 211 days.

(21) Appl. No.: 12/416,251

(22) Filed: Apr. 1, 2009

(65) Prior Publication Data
US 2009/0295124 A1 Dec. 3, 2009

(30) Foreign Application Priority Data
May 29, 2008 (CA) .................................. 2635886

(51) Int. Cl.
*B60P 1/44* (2006.01)
(52) U.S. Cl. ..................................... 414/482; 280/43.11
(58) Field of Classification Search .......... 414/481–485; 280/43.11
See application file for complete search history.

(56) References Cited

U.S. PATENT DOCUMENTS

| | | | |
|---|---|---|---|
| 2,577,246 A | 12/1951 | Hill | |
| 3,860,255 A | 1/1975 | Rodriguez | |
| 4,077,643 A | 3/1978 | Bates | |
| 4,490,089 A * | 12/1984 | Welker | 414/483 |
| 4,673,328 A * | 6/1987 | Shiels | 414/471 |
| 5,308,213 A * | 5/1994 | Gilbertson | 414/482 |
| 5,474,416 A * | 12/1995 | Rogge et al. | 414/482 |
| 5,536,131 A * | 7/1996 | Behr | 414/495 |
| 5,649,802 A * | 7/1997 | Babcock | 414/483 |
| 5,810,544 A * | 9/1998 | Wellman | 414/495 |
| 6,520,521 B2 | 2/2003 | Mayfield | |
| 6,945,744 B1 * | 9/2005 | Swanson | 414/482 |

FOREIGN PATENT DOCUMENTS
EP 0 245 104 A2 11/1987
* cited by examiner

*Primary Examiner* — Charles A Fox
(74) *Attorney, Agent, or Firm* — Ryan W. Dupuis; Kyle R. Satterthwaite; Ade & Company Inc.

(57) ABSTRACT

A trailer has a deck frame arranged to carry a load thereon for being towed by a towing vehicle in a transport position spaced above the ground. The deck frame is further arranged to be lowered from the transport position to a loading position at ground level. Side rails supporting wheels thereon are hinged at a rear of the deck frame and are pivotally coupled to a hitch arm at a front end. A lift mechanism lifts the front end of the deck frame in the loading position relative to the front of the side rails to simultaneously raise the rear end of the deck frame by lowering the front of the side rails relative to the ground. The hitch arm may remain coupled to the towing vehicle as the deck frame is displaced between the loading and transport positions.

19 Claims, 5 Drawing Sheets

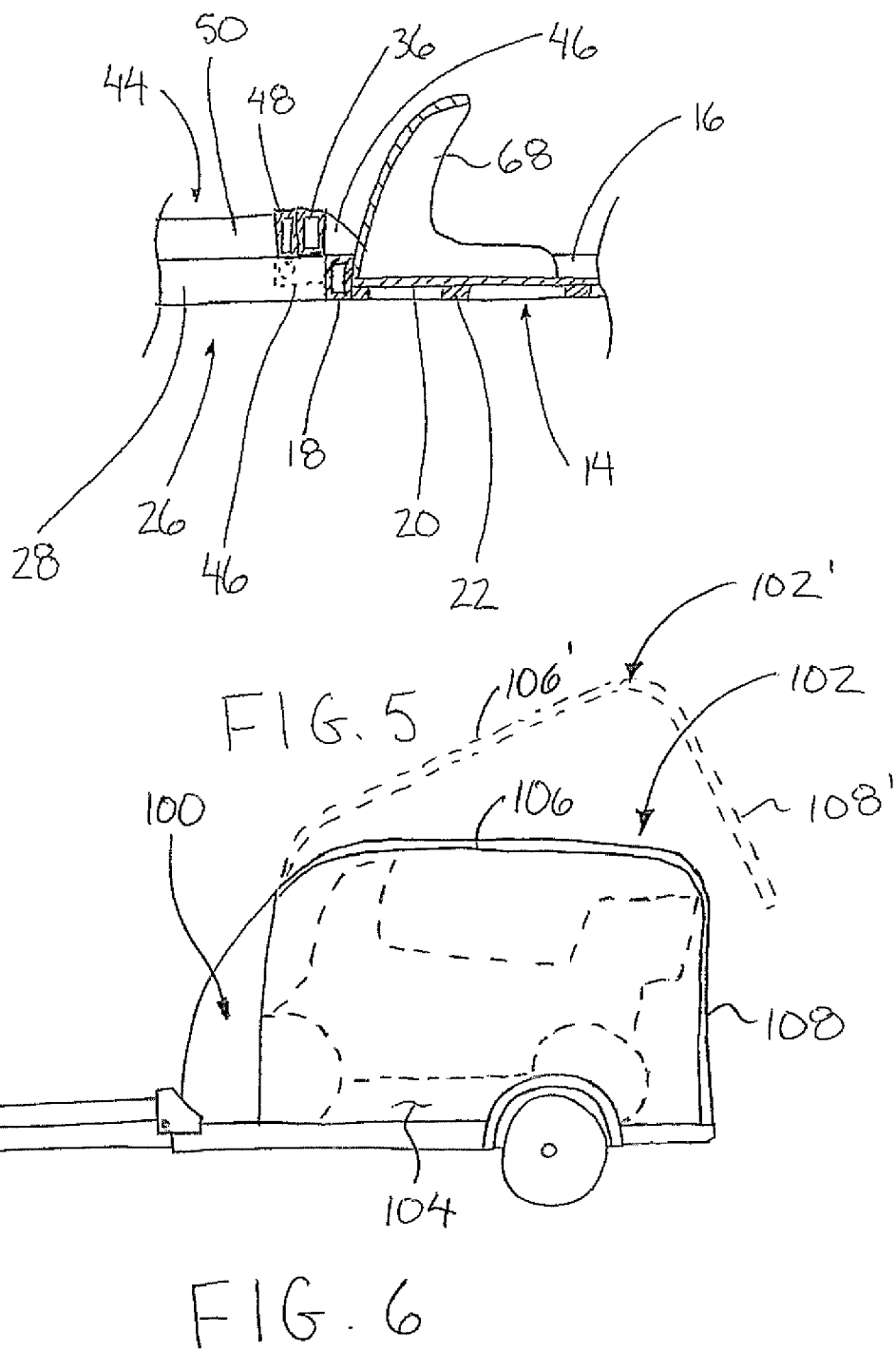

GROUND LEVEL LOADING TRAILOR

This application claims foreign priority benefits from Canadian Patent Application 2,635,886 filed May 29, 2008.

FIELD OF THE INVENTION

The present invention relates to a trailer having a deck frame arranged to carry a load thereon for being towed by a towing vehicle in a transport position in which the deck frame is arranged to be lowered from the transport position to a loading position substantially at ground level.

BACKGROUND

It is known to be desirable to load a trailer at an elevation close to the ground so that no unnecessary lifting or auxiliary ramps are required. When loading a motorcycle, use of ramps involves a risk of the motorcycle tipping over during loading which can be dangerous to the operator due to the potentially elevated height of the ramp and the trailer onto which the motorcycle is loaded.

Various prior art examples of trailers are disclosed in the following patents.

U.S. Pat. No. 3,860,255 belonging to Rodriguez discloses a lift trailer in which a load carrying deck of the trailer can be lowered substantially to ground level by releasing the deck frame from the wheeled frame upon which the hitch is fixed by raising the hitch upwardly to be spaced well above the deck frame in a loading position. Accordingly the hitch must be uncoupled from a towing vehicle in order to load the trailer which can be awkward and cumbersome in some instances.

U.S. Pat. No. 6,520,521 belonging to Mayfield and U.S. Pat. No. 2,577,246 belonging to Hill disclose trailers in which a deck frame for supporting a load thereon includes the hitch fixedly coupled at a front end thereof with the rear being supported on a wheeled frame which can be pivoted into a raised position relative to the deck frame to effectively lower the rear of the deck frame to the ground for loading. In each instance however the fixed connection of the hitch at the front of the trailer does not permit the entire deck frame to be lowered to the ground unless the hitch is uncoupled from a towing vehicle and is also permitted to be placed on the ground.

U.S. Pat. No. 4,673,328 belonging to Shiels, U.S. Pat. No. 4,077,643 belonging to Bates and European application 0 245 104 A2 disclose further examples of trailers in which a deck frame upon which a load is arranged to be supported can be lowered relative to the surrounding wheeled frame however a complex mechanism is required in each instance to raise and lower the deck frame relative to the wheeled frame resulting in an increased potential for failure. Furthermore failure of the lift mechanism which raises the deck frame into the transport position can result in the deck frame dangerously falling during transport.

SUMMARY OF THE INVENTION

According to one aspect of the invention there is provided a trailer for being towed in a forward direction, the trailer comprising:

a deck frame arranged to carry a load thereon and comprising a pair of opposing sides extending generally in the forward direction between a front end and a rear end of the deck frame;

a pair of side rails hinged at respective rear ends on respective ones of the opposing sides of the deck frame adjacent the rear end of the deck frame to extend generally forwardly to respective front ends of the side rails such that the side rails are arranged for pivotal movement relative to the deck frame about a first lateral axis oriented generally perpendicularly to the forward direction;

a wheel supported on each side rail at a location spaced forwardly from the rear end of the side rail and being arranged for rolling movement in the forward direction;

a hitch arm pivotally coupled to the side rails adjacent the front end of the side rails so as to be arranged for pivotal movement relative to the side rails about a second lateral axis oriented generally perpendicularly to the forward direction; and a hitch connector at a forward end of the hitch arm arranged for connection to a towing vehicle;

the deck frame being movable between a loading position and a transport position;

wherein in the loading position the deck frame is arranged to lay substantially at ground level such that the side rails extend upwardly and forwardly to the front ends of the side rails which are spaced above the front end of the deck frame; and wherein in the transport position the front end of the deck frame is arranged to be supported spaced above the ground by the hitch arm such that the front ends of side rails are lowered relative to the loading position and the deck frame is supported for rolling movement on the wheels.

By providing a hitch arm which is pivotally coupled to the side rails carrying the wheels thereon, the deck frame can be lowered to ground level while the hitch remains coupled to the towing vehicle. Accordingly the advantages of convenience of loading at ground level can be obtained simultaneously with the convenience of the hitch remaining connected to the towing vehicle during loading. Furthermore, the design permits the deck frame to be readily secured by fastening the deck frame to the hitch arm in the transport position for added security as compared to prior art configurations.

The hitch arm is preferably arranged to extend forwardly at a downward incline from the side rails in the loading position so as to be arranged to remain connected to a towing vehicle in the loading position.

The deck frame is preferably arranged to extend horizontally between the front end and the rear end thereof in both the loading position and the transport position.

There may be provided a lifting mechanism coupled between the front end of the deck frame and one of either a rear end of the hitch arm or the front ends of the side rails in which the lifting mechanism is arranged to lift the front end of the deck frame relative to the front end of the side rails.

The lifting mechanism may comprise a winch arranged to wind a cable thereon to lift the front end of the deck frame relative to the rear end of the hitch arm and the front end of the side rails. When the winch is supported on the hitch arm, there may be provided a pulley supported on the deck frame in which the cable extends from the winch around the pulley to be anchored on the hitch arm. In a preferred arrangement, the winch is supported at the front end of the side rails for direct connection of the free end of the winch cable to the front end of the deck frame.

Preferably there is provided a plurality of mounts at longitudinally spaced positions in the forward direction along the hitch arm which are arranged to fix the hitch arm relative to the deck frame in the transport position independently of the lift mechanism.

The deck frame may also be arranged to overlap the hitch arm in the transport position.

The deck frame may comprise a rectangular main portion arranged to carry the load thereon and a hitch supporting portion extending forwardly from the main portion in fixed relation therewith in which the hitch supporting portion is arranged to be secured to the hitch arm in fixed relation in the transport position.

A base member of the hitch arm and a crossbar joining the side members may be arranged to abut one another in the transport position to function as a stop which is arranged to prevent further pivotal movement of the hitch arm upwardly beyond a plane of the side rails.

When the rear end of the hitch arm is supported in fixed relative orientation on a base member, the base member is preferably hinged at opposing ends thereof on the front ends of the side rails respectively.

The crossbar is preferably fixed between the front ends of the side rails in a generally U-shaped configuration such that the crossbar and side rails are fixed in orientation relative to one another for pivotal movement together about the first lateral axis relative to the deck frame.

The hitch arm and the side rails may be arranged to be substantially parallel with one another in the loading position.

When the deck frame comprises a flat deck surface arranged to carry the load thereon, preferably there is provided a ramp edge along the rear end of the deck frame which is arranged to extend downwardly and rearwardly from the deck surface to the ground in the loading position.

The deck frame may comprise two side members extending along the pair of opposing sides of the deck frame and a rigid deck surface spanning between the two side rails in which the deck surface is recessed in relation to an upper surface of the two side members.

The deck frame may comprise a wheel mount supported centrally on the front end thereof which is arranged for supporting a front wheel of a motorcycle therein.

Some embodiments of the invention will now be described in conjunction with the accompanying drawings in which:

BRIEF DESCRIPTION OF THE DRAWINGS

FIG. 5 is a sectional view along the line 5-5 of FIG. 3 in the transport position.

FIG. 6 is a side elevational view of an alternative embodiment of the trailer in a transport position.

In the drawings like characters of reference indicate corresponding parts in the different figures.

DETAILED DESCRIPTION

Figure 1:
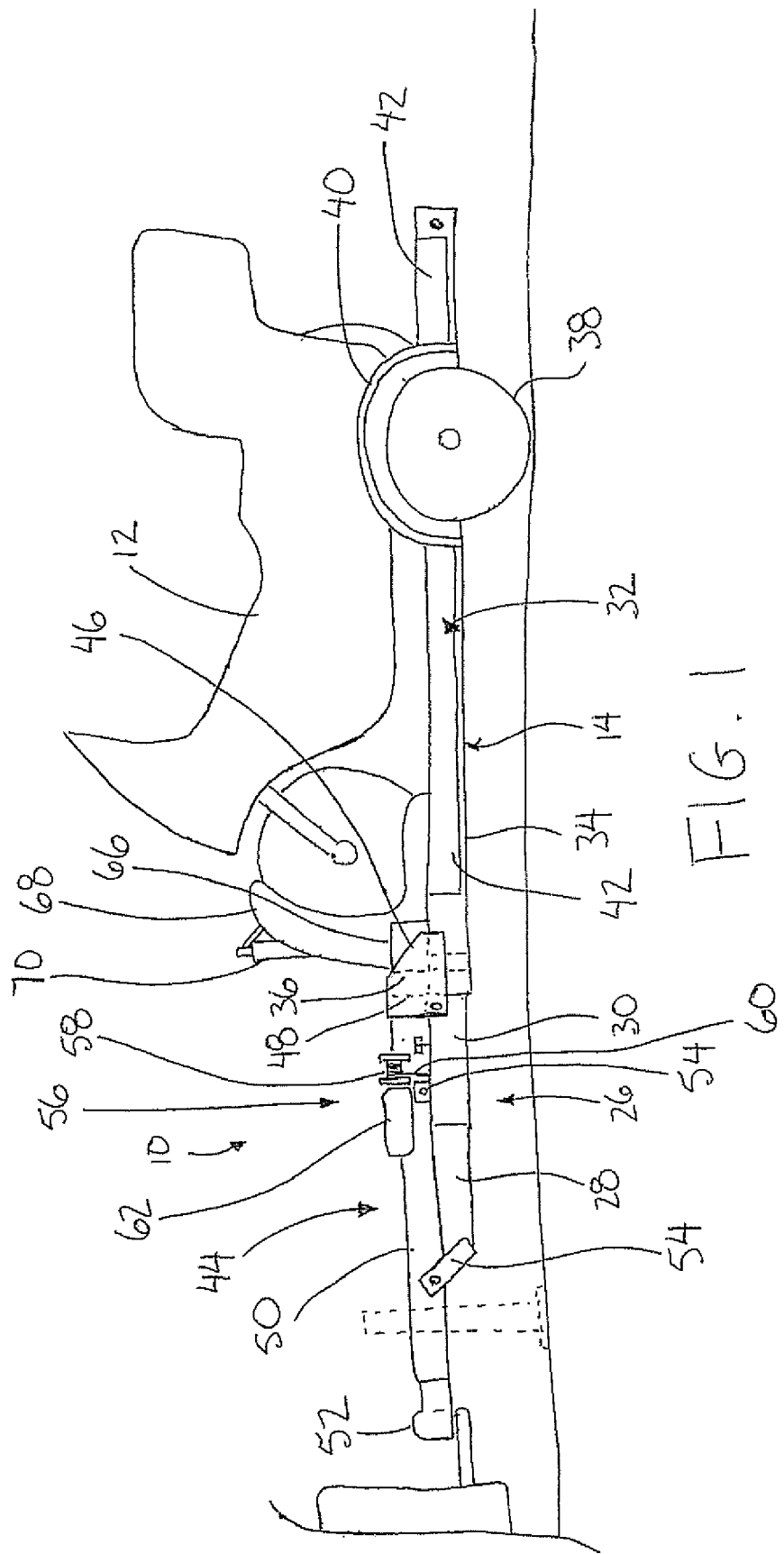
FIG. 1 is a side elevational view of the trailer in a transport position.
Figure 2:
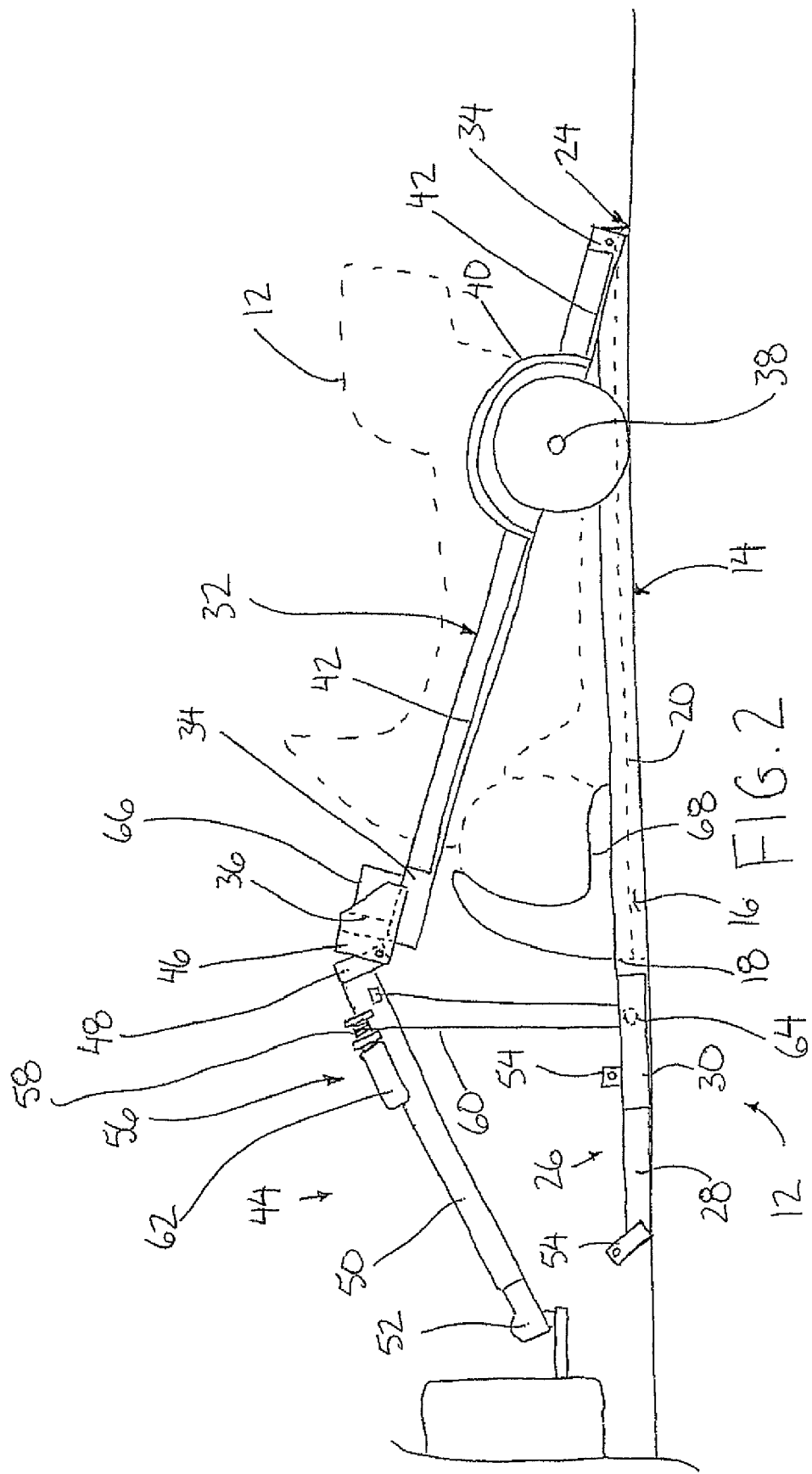
FIG. 2 is a side elevational view of the trailer in a loading position.
Figure 3:
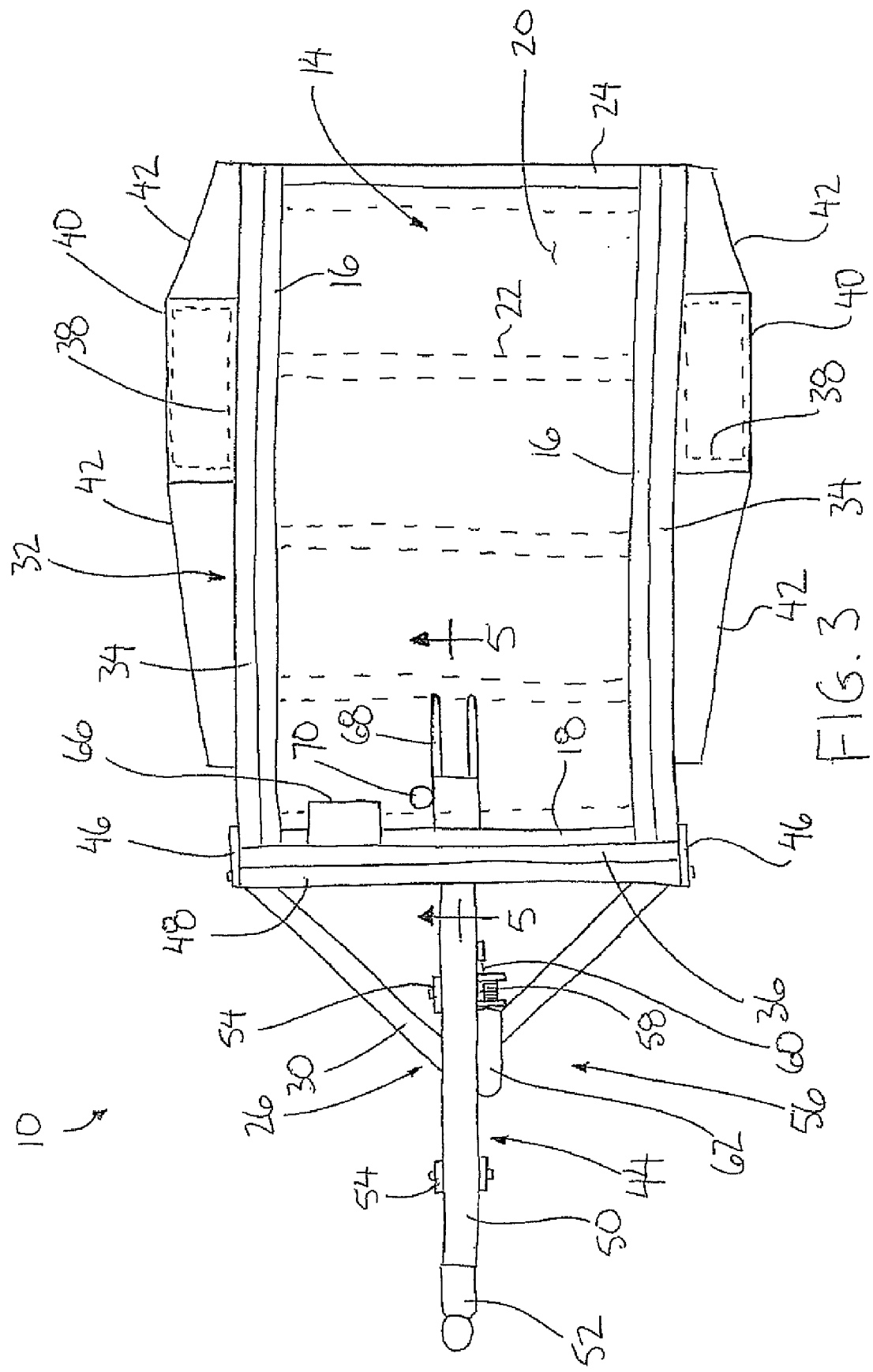
FIG. 3 is a top plan view of the trailer in the transport position.
Figure 4:
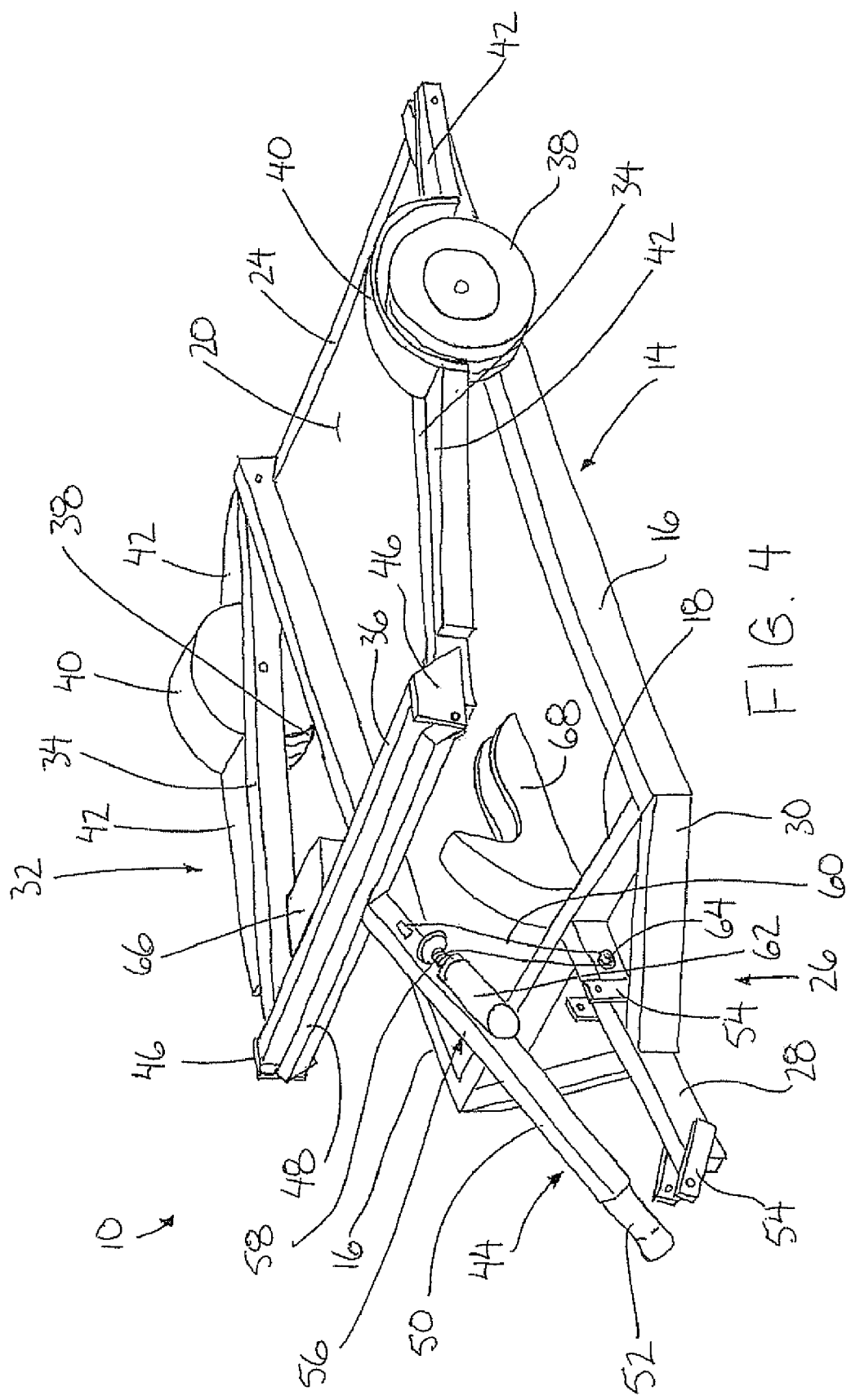
FIG. 4 is a perspective view of the trailer in the loading position.

Referring to the accompanying figures there is illustrated a ground level loading trailer generally indicated by reference numeral 10. The trailer 10 is arranged for connection to a towing vehicle in a transport position for rolling movement in a forward direction. The trailer 10 is particularly suited for being displaced into a loading position substantially at ground level for convenience in loading various objects thereon, for example for loading a motorcycle 12 as shown in the illustrated embodiment.

The trailer 10 comprises a deck frame 14 including two side members 16 extending in a longitudinal direction along opposing sides of a rectangular main portion of the deck frame between a front end and a rear end thereof. The deck frame further includes a front member 18 comprising a rigid beam of rectangular cross section similar to the side members 16 so as to be fixed spanning perpendicularly between the two side members 16 at the front end thereof to form a generally U-shaped configuration with the side member.

The deck frame further includes a deck surface 20 comprising a rigid sheet which spans between the two side members 16 from the front end to the rear end of the main portion of the deck frame. The deck surface 20 is recessed in elevation relative to the upper surface of the side member 16. A plurality of floor members 22 extend between the two side members 16 adjacent the bottom side thereof to support the deck surface 20 spanning thereabove below the top side of the front member and the two side members 16. The deck surface 20 includes a ramp edge 24 which is sloped downwardly and rearwardly from a rear edge of the rigid sheet forming the deck surface to a rear edge which is substantially coplanar with a bottom of the floor members 22 and the side members 16. The deck frame is thus arranged for laying horizontally flat against the ground at ground level in a loading position so that various objects, for example a motorcycle 12 can be rolled directly onto the deck surface from the ground.

The deck frame 14 further includes a hitch support portion 26 which is fixed onto the front member 18 to extend generally forward therefrom. The hitch support portion comprises primarily of a hitch support member 28 which is centered in a lateral direction between the two opposing sides of the deck frame to extend forwardly in a generally common plane with the side members 16. The hitch support portion 26 of the deck frame further includes a pair of brace members 30 spanning from the front end of the two side members 16 respectively, forwardly at an inward incline towards one another to be fixedly joined with the hitch support member 28 spaced forwardly of the front member 18 of the main portion of the deck frame for added structural support.

The trailer further includes a pivot frame 32 comprised of two side rails 34 which are parallel and spaced apart from one another so as to extend in a longitudinal direction from a rear end to the front end of the main portion of the deck frame along outer sides of the two side members 16 of the deck frame respectively in a transport position of the trailer. The pivot frame further includes a crossbar 36 fixed between the two side rails 34 at the front ends thereof to form a generally U-shaped frame with the two side rails. The pivot frame is coupled at a rear end to the rear end of the deck frame 14 for relative pivotal movement about a first lateral axis which is oriented perpendicular to the forward direction and extends horizontally in a lateral direction. The pivot frame is coupled to the deck frame by hinging a rear end of each of the side rails 34 to the rear end of the corresponding side member 16 of the deck frame so that the pivot frame is pivotal between the transport position in which the pivot frame is substantially coplanar with the deck frame and the loading position in which the side rails 34 of the pivot frame extend upwardly and forwardly from the rear of the deck frame so that the forward ends of the pivot frame, which are joined by the crossbar 36, are spaced above the front end of the deck frame in the loading position.

Two wheels are supported on the pivot frame at the outer sides of the side rails at respective locations spaced forwardly from the pivotal connection to the side members of the deck frame. One wheel is supported on each of the side rails 34 of the pivot frame so as to be arranged for rolling movement in the forward direction at a location which is closer to the rear end of the deck frame than the front end while being spaced forwardly from the rear end by an amount greater than the diameter of the wheels, in the order of twice the diameter of the wheels in the illustrated embodiment.

The wheels are supported for rotation about a common wheel axis which is spaced forwardly of the first lateral axis of relative pivotal movement between the pivot frame and the deck frame. The wheels are arranged to remain engaged with the ground as the deck frame is displaced between the transport position and the loading position. When the deck frame is lowered, the front ends of the side rails of the pivot frame are displaced upwardly from a horizontal position so that the wheels act as fulcrum and the rear ends of the side rails are displaced downwardly to be located adjacent the ground in the loading position when the deck frame to which the rear ends of the side rails are coupled lays flat on the ground. Accordingly the side rails extend upwardly and forwardly from the rear of the deck frame in the loading position.

The pivot frame further includes two fenders 40 which extend circumferentially about an upper portion of each wheel spaced radially upward therefrom such that the forward and rear ends of the fenders are approximately diametrically opposite one another with the wheel axle therebetween. A plurality of deck extension panels 42 are mounted to extend generally in the longitudinal direction from both front and rear sides of each fender in a generally common plane with one another and the two side rails of the pivot frame. The deck extension panels 42 span laterally outward in the lateral direction from the side rails approximately a width of the fenders and the wheels at respective inner ends adjacent the fenders and are reduced in lateral dimension as the panels extend outwardly to the respective forward and rearward ends of the pivot frame where the panels terminate.

A hitch frame 44 is pivotally coupled to the front end of the pivot frame for relative pivotal movement about a second lateral axis also oriented perpendicularly to the forward direction to extend horizontally in a lateral direction relative to the side rails of the pivot frame. Mounting plates 46 are provided spanning opposing ends of the crossbar 36 of the pivot frame which project forwardly from the pivot frame to mount a base member 48 of the hitch frame extending therebetween. The base member 48 accordingly extends laterally across the front of the pivot frame crossbar and is pivotally supported at opposing ends adjacent a bottom side thereof on the mounting plates 46 respectively for pivotal movement about the second lateral axis. The base member 48 accordingly spans the width of the pivot frame similarly to the crossbar.

The hitch frame also includes a hitch arm 50 which is fixed mounted centrally on the base member to project forwardly therefrom perpendicularly to the base member generally in the forward direction. The hitch arm is fixed to the base member for pivotal movement therewith about the second lateral axis. The hitch arm is arranged to extend above and along the top side of the hitch supporting member 28 of the deck frame in the transport position with the base member and the crossbar being abutted alongside one another directly above the front member of the deck frame.

By pivotally supporting the base member 48 adjacent the bottom side thereof, a top side of the base member is arranged for abutment with the front side of the crossbar when the hitch arm extends generally horizontally in common plane with the pivot frame so that the abutment between the base member and the crossbar functions as a stop to prevent upwardly pivotal movement of the hitch arm beyond a horizontal orientation aligned in a common plane with the pivot frame in the transport position. The hitch arm however is freely pivotal downwardly relative to the plane of the side rails of the pivot frame so that when the side rails of the pivot frame extend upwardly and forwardly in the loading position, the hitch arm may extend generally forwardly through a range of upward and downward inclines with the rear end of the hitch arm being spaced above the front end of the deck. Accordingly in the loading position with the deck frame positioned at ground level, the hitch arm may be pivoted into a downward and forward inclination so as to remain connected to a towing vehicle by a hitch connector 52 at the forward most end of the hitch arm.

Two mounts 54 are provided on the hitch supporting member 28 of the deck frame at longitudinally spaced positions along the hitch supporting member for selective engagement with the hitch arm at spaced positions along the hitch arm in the transport position. Each mount 54 comprises a pair of parallel plates mounted on opposing sides of the hitch supporting member to extend generally upward therefrom. The plates are accordingly spaced apart so as to receive a portion of the hitch arm therebetween at each of the mounts 54. Cooperating apertures in the plates of each mount cooperate with the hitch arm to receive a suitable locking pin therethrough in the transport position which effectively locks the hitch supporting member of the deck frame to be horizontal and parallel with the hitch arm in the transport position. The pivotal coupling of the rear end of the hitch arm to the front end of the side rails of the pivot frame accordingly forces the pivot frame to be displaced downwardly at the front end thereof to remain engaged with the front end of the deck frame in the transport position.

A lift mechanism 56 is coupled between the rear of the hitch arm 44 which is in turn connected to the front end of the pivot frame and the front of the main portion of the deck frame at the hitch supporting member so that the lift mechanism 56 operates to lift the front end of the deck frame relative to the front end of the side rails of the pivot frame and the rear end of the hitch arm pivotally coupled thereto. Lowering the front end of the pivot frame in turn causes the pivot frame to be pivoted about the wheels which function as a fulcrum to lift the rear ends of the side rails of the pivot frame and the deck frame into the transport position from the loading position.

The lift mechanism comprises a winch including a drum 58 onto which a cable 60 is arranged to be wound by a suitable electric motor 62. The cable 60 extends from the drum supported on the rear end of the hitch arm downwardly through a pulley 64 rotatably supported at a rear end of the hitch supporting member of the deck frame. The end of the cable 60 is anchored on the hitch arm adjacent the mounting of the drum 58.

Operating the winch in a winding direction causes the cable between the hitch arm and the deck frame to be shortened so that the front end of the deck frame is raised while the front end of the side rails of the pivot frame are simultaneously lowered from the loading position to transport position.

Operating the winch in an opposing unwinding direction causes the cable to be lengthened for effectively lowering the deck frame relative to the front ends of the side rails of the pivot frame towards the loading position. By lowering the deck frame relative to the front ends of the side rails, the front ends of the side rails are permitted to in turn be displaced upwardly so that the lowering of the rear ends of the side rails simultaneously lowers the rear end of the deck frame. The electric motor 62 is arranged to be driven by power from a battery 64 supported on the pivot frame at the front crossbar with the battery 64 being coupled through towing connection to the towing vehicle for recharging of the battery.

In the illustrated embodiment for supporting a motorcycle, the deck surface 20 of the deck frame includes a front wheel support 68 comprising a pair of parallel plates arranged to receive the front wheel of the motorcycle therebetween for securement during transport. The deck surface has a length and width which corresponds to at least a length and width of a typically motorcycle to adequately support the motorcycle thereon.

In the loading position, the deck frame lays flat on the ground with the hitch arm and the front end of the pivot frame being freely supported above the front end of the deck frame so that that the front end of the deck frame is unsupported on the ground. The weight of the deck frame allows the rear end of the deck frame to remain engaged upon the ground in the loading position while causing the rear ends of the side rails of the pivot frame to be similarly displaced downwardly against the ground so that the wheels supported on the side rails act as fulcrum to cause the side rails to extend upwardly and forwardly to the front ends thereof spaced above the deck frame upon which the rear end of the hitch arm is supported. The free pivotal connection of the rear end of the hitch arm on the front end of the side rails of the pivot frame permits the hitch connector at the front end of the hitch arm to be pivoted downward relative to the pivot frame so that it may remain engaged in connection with a towing vehicle in the loading position.

Once the deck frame has been loaded with cargo, for example a motorcycle 12, the lift mechanism is operated to raise the front end of the deck frame relative to the ground and the front ends of the side rails of the pivot frame so that the forward end of the hitch supporting member comes into engagement with the hitch arm at a location spaced between the hitch connector and the rear end pivotally coupled on the pivot frame. Continued lifting of the front end of the deck frame relative to the front end of the side rails of the pivot frame causes the hitch arm and the side rails of the pivot frame to come into horizontal alignment with one another in a generally common plane after which further upward pivotal movement of the hitch arm relative to the pivot frame is prevented by abutting inter-engagement between the base member of the hitch frame and the front crossbar of the pivot frame. Once the hitch arm and the pivot frame lay flat against the deck frame in a horizontal orientation therewith, suitable locking pins are inserted through the cooperating apertures in the mounts 54 so that the deck frame can be rigidly secured to the hitch arm at longitudinally spaced positions therealong. The hitch arm and the pivot frame are accordingly arranged to be secured in the transport position relative to the deck frame independently of the lift mechanism so that once locking pins fixedly secure the hitch supporting member of the deck frame to the hitch arm, any failure of the lifting mechanism will not cause failure of the trailer to fall back into the loading position.

A jack stand 70 is provided for selective mounting on the hitch arm for supporting the hitch arm spaced above the ground in the transport position for storage when disconnected from a towing vehicle. When not is use, the jack stand can be selectively coupled to the front wheel support 68 of the deck frame.

In further embodiments of the trailer, the winch body 56 of the lift mechanism can be anchored onto either the front end of the pivot frame or the front end of the deck frame 14. In either instance, the free end of the winch cable 60 is anchored to the other one of the pivot frame and the deck frame so that the lift mechanism can bring the front end of the pivot frame and the front end of the lift frame together from the loading position to the transport position. The anchoring location on the pivot frame typically comprises the crossbar 36 at the front end of the side rails 34. The anchoring location on the deck frame typically comprises the front frame member 18 or the deck surface spanning between the side frame members.

In yet further embodiments, other lift mechanisms may be provided connected between the rear end of the hitch arm or the front end of the pivot frame and the front end of the deck frame or the hitch support portion 26 thereof.

Turning now to FIG. 6, according to a further embodiment of the trailer, a guard member 100 is provided mounted on the front end of the deck frame 14 to extend upwardly from the front frame member 18 across a full width of the trailer between the two side members 16. The guard member 110 comprises a rigid panel which extends upwardly at a slight rearward incline so that the resulting trailer is somewhat aerodynamic. The overall height of the panel forming the guard member is in the order of three feet so as to be near in height to a motorcycle supported on the trailer while spanning a width which is greater than the motorcycle in the lateral direction to guard the motorcycle from debris and the like thrown upwardly from the road surface by a towing vehicle.

The guard member 100 as illustrated includes a front portion extending upwardly from the front frame member 18 and a pair of side portions extending upwardly from the two side members 16 at opposing ends of the front portion to partially surround the front wheel of a motorcycle received therebetween. The guard member 100 is secured to the deck frame so as to be readily removable therefrom using suitable removable fasteners such as threaded fasteners and the like. The guard member is typically anchored to the front frame member 18 at the front portion thereof and to the two side members 16 at the side portions thereof spaced laterally and rearwardly outwardly from the fasteners of the front portion to adequately secure the guard member relative to the deck frame. With the exception of the crossbar 36, the two side rails 34 of the pivot frame remain open therebetween by a width of the deck frame and the guard member supported thereon so that the guard member does not interfere with movement of the pivot frame between the transport and loading positions.

In yet further embodiments, the trailer is provided with a full cover 102 arranged to fully enclose the motorcycle supported on the deck frame of the trailer. In the illustrated embodiment of FIG. 6, the cover 102 comprises two side panels 104 which extend generally vertically upward from the two side members 106 so as to be generally parallel and spaced apart from one another by the width of the trailer between the two side members for receiving the motorcycle therebetween. Each of the two side panels extends upward to a height near three feet so as to be near in height to the motorcycle received therebetween. The two side panels 104 may be integrally formed or fastened to the guard member 100 which forms a front panel of the cover 102.

To fully enclose the motorcycle, the cover 102 also comprises a top panel 106 and a rear panel 108. The top panel is hinged along a forward edge to the top end of the front panel formed by the guard member 100 at a top edge thereof for relative pivotal movement about a horizontal pivot axis oriented perpendicular to the forward working direction of the trailer. The top panel 106 extends generally horizontally rearward a full length of the deck frame in a closed position of the cover to terminate near a rear end of the two side panels 104.

The rear panel 108 is integrally joined with the top panel along the rear edge thereof such that the rear panel extends downward from the top panel a full height of the cover from the top panel to the rear edge of the deck in the closed position of the cover, while also spanning a full width between the side panels 104 at the rear of the trailer. The top panel and the rear panel are integrally joined together for pivotal movement together about the pivot axis at the front end of the top panel between the closed position shown in solid line in FIG. 6 in which the rear panel is generally vertical in orientation spanning the rear side of the trailer upwardly from the deck frame and the open position shown in broken line in FIG. 6 in which the rear panel 108 is spaced upwardly from the deck frame together with the rear edge of the top panel to which it is coupled by upward pivotal movement of the top and rear panels from the closed position. A suitable locking mechanism can be mounted at the bottom edge of the rear panel 108 for selective anchoring to the rear edge of the deck frame to prevent unauthorized access to the interior of the cover.

The side edges of the top and rear panels are arranged to join the top and rear edges of the two side panels 104 respectively in relative sealing engagement by use of weather stripping and/or overlapping mating flanges such that the cover 102 protects the contents therein from the weather in the closed position. Accordingly the cover may be used for storing a motorcycle therein during the winter season for example. When transporting a motorcycle for use in a summer season for example, the cover can be left in place to provide added protection for the motorcycle supported on the deck frame, or alternatively the side panels 104 and the top and rear panels of the cover 102 can be readily removed so that only the guard member 100 remains attached to the deck frame using readily releasable fasteners and the like to selectively separate the panels from the deck frame.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A trailer for being towed in a forward direction, the trailer comprising:
    a deck frame arranged to carry a load thereon and comprising a pair of opposing sides extending generally in the forward direction between a front end and a rear end of the deck frame;
    a pair of side rails hinged at respective rear ends on respective ones of the opposing sides of the deck frame adjacent the rear end of the deck frame to extend generally forwardly to respective front ends of the side rails such that the side rails are arranged for pivotal movement relative to the deck frame about a first lateral axis oriented generally perpendicularly to the forward direction;
    a wheel supported on each side rail at a location spaced forwardly from the rear end of the side rail and being arranged for rolling movement in the forward direction;
    a hitch arm pivotally coupled to the side rails adjacent the front end of the side rails so as to be arranged for pivotal movement relative to the side rails about a second lateral axis oriented generally perpendicularly to the forward direction; and
    a hitch connector at a forward end of the hitch arm arranged for connection to a towing vehicle;
    the deck frame being movable between a loading position and a transport position;
    wherein in the loading position the deck frame is arranged to lay substantially at ground level such that the side rails extend upwardly and forwardly to the front ends of the side rails which are spaced above the front end of the deck frame; and
    wherein in the transport position the front end of the deck frame is arranged to be supported spaced above the ground by the hitch arm such that the front ends of side rails are lowered relative to the loading position and the deck frame is supported for rolling movement on the wheels; and
    the deck frame comprising a main portion arranged to carry the load thereon and a hitch supporting portion including a hitch support member which extends forwardly from the main portion in fixed relation therewith, the hitch supporting portion being arranged to be secured to the hitch arm in fixed relation in the transport position.

2. The trailer according to claim 1 wherein the hitch arm is arranged to extend forwardly at a downward incline from the side rails in the loading position so as to be arranged to remain connected to a towing vehicle in the loading position.

3. The trailer according to claim 1 wherein there is provided a lifting mechanism coupled between the front end of the deck frame and one of either a rear end of the hitch arm or the front ends of the side rails, the lifting mechanism being arranged to lift the front end of the deck frame relative to the front end of the side rails.

4. The trailer according to claim 3 wherein the lifting mechanism comprises a winch arranged to wind a cable thereon to lift the front end of the deck frame relative to the rear end of the hitch arm and the front end of the side rails.

5. The trailer according to claim 3 wherein there is provided at least one mount arranged to fix the hitch arm relative to the deck frame in the transport position independently of the lift mechanism.

6. The trailer according to claim 1 wherein there is provided at least one mount arranged to fix the hitch arm relative to the deck frame in the transport position.

7. The trailer according to claim 6 wherein said at least one mount comprises a plurality of mounts arranged to fix the hitch arm to the deck frame at longitudinally spaced positions in the forward direction.

8. The trailer according to claim 1 wherein the main portion arranged to carry the load thereon is rectangular.

9. The trailer according to claim 1 wherein there is provided a stop arranged to prevent pivotal movement of the hitch arm upwardly beyond a plane of the side rails.

10. The trailer according to claim 1 wherein a rear end of the hitch arm is supported in fixed relative orientation on a base member, the base member being hinged at opposing ends thereof on the front ends of the side rails respectively.

11. The trailer according to claim 1 wherein the side rails are joined by a crossbar supporting the side rails in fixed orientation relative to one another for pivotal movement together about the first lateral axis relative to the deck frame.

12. The trailer according to claim 11 wherein the crossbar is fixed between the front ends of the side rails in a generally U-shaped configuration.

13. The trailer according to claim 1 wherein the hitch arm and the side rails are arranged to be substantially parallel with one another in the leading transport position.

14. The trailer according to claim 1 wherein the deck frame comprises a flat deck surface arranged to carry the load thereon and a ramp edge along the rear end of the deck frame arranged to extend downwardly and rearwardly from the deck surface to the ground in the loading position.

15. The trailer according to claim 1 wherein the deck frame comprises two side members extending along the pair of opposing sides and a rigid deck surface spanning between the two side rails, the deck surface being recessed in relation to an upper surface of the two side members.

16. The trailer according to claim 1 wherein the deck frame comprises a wheel mount supported centrally on the front end thereof which is arranged for supporting a front wheel of a motorcycle therein.

17. The trailer according to claim 1 wherein the deck frame is arranged to extend horizontally between the front end and the rear end thereof in both the loading position and the transport position.

18. The trailer according to claim 1 wherein there is provided a guard member supporting on the deck frame to extend upwardly from the front end of the deck frame to a top end spaced above the deck frame.

19. The trailer according to claim 1 wherein the hitch support member of the deck frame includes a forward end oriented relative to the deck frame so as to be arranged to engage the hitch arm at a location spaced in between the hitch connector and a rear end of the hitch arm which is pivotally coupled to the side rails at an intermediate position of the deck frame as the deck frame is lifted from the loading position to the transport position.

* * * * *